(12) United States Patent
Theriot

(10) Patent No.: US 6,696,012 B1
(45) Date of Patent: Feb. 24, 2004

(54) RING GEAR MOUNTED RACK ADJUSTABLE TORCH ARM CARRIAGE ASSEMBLY WITH OUT-OF-ROUND CAPABILITY

(75) Inventor: Peter B. Theriot, Tulsa, OK (US)

(73) Assignee: Mathey Dearman, Inc., Tulsa, OK (US)

( * ) Notice: Subject to any disclaimer, the term of this patent is extended or adjusted under 35 U.S.C. 154(b) by 12 days.

(21) Appl. No.: 10/047,642

(22) Filed: Jan. 15, 2002

(51) Int. Cl.$^7$ .............................................. B23K 37/02
(52) U.S. Cl. .............................. 266/56; 266/76; 266/48
(58) Field of Search ............................ 266/48, 56, 55, 266/54, 76

(56) References Cited

U.S. PATENT DOCUMENTS

| | | | | |
|---|---|---|---|---|
| 2,408,517 A | * | 10/1946 | Howard | 266/48 |
| 2,687,880 A | * | 8/1954 | Waterson | 266/56 |
| 2,698,748 A | * | 1/1955 | Evans | 266/48 |
| 2,813,342 A | * | 11/1957 | Livers | 266/48 |
| 5,110,095 A | * | 5/1992 | Dougal | 266/55 |

* cited by examiner

*Primary Examiner*—Scott Kastler
(74) *Attorney, Agent, or Firm*—Frank J Catalano

(57) ABSTRACT

A torch carriage assembly for use in bevel cutting a pipe has a ring gear which rotates concentrically about the pipe longitudinal axis. A shaft extending perpendicularly from the ring gear carries a torch arm block assembly which positions the cutting torch in relation to the pipe. A bracket is adaptable between a first configuration prohibiting and a second configuration permitting rotation of the shaft about its longitudinal axis for bevel cutting round pipes and out-of-round pipes, respectively. In the second configuration, a guide wheel assembly mounted on the shaft traces the surface of the pipe. A tension assembly continually urges the guide wheel assembly into contact with the surface of the pipe so that the angular position of the torch arm block assembly accurately reflects the out-of-round conditions of the pipe.

4 Claims, 6 Drawing Sheets

RING GEAR MOUNTED RACK ADJUSTABLE TORCH ARM CARRIAGE ASSEMBLY WITH OUT-OF-ROUND CAPABILITY

This invention relates generally to torch equipment for bevel cutting pipe and more particularly concerns a ring gear mounted; rack adjustable torch arm carriage assembly capable of accurately bevel cutting out-of-round pipes.

Pipe cutting torches are generally mounted on either a wheeled carriage which rides directly on the outer surface of the pipe or on a carriage which rides on a ring gear which surrounds the circumference of the pipe.

The wheeled carriage device travels on the pipe. Therefore, out-of-round adjustment is generally unnecessary if it is assumed that the pipe cross section along the path of the wheel carriage is identical to the pipe cross section along the path of the torch. However, adaptation of the wheeled carriage device to a variety of pipe sizes is time consuming and complicated. Furthermore, the tendency of the wheeled carriage device to drift during operation introduces error in the accuracy of the cut. The net result is a comparatively slow and inaccurate cutting operation.

The ring gear carriage devices use a saddle fixed to the outer diameter of the pipe with the ring gear being rotatable around the pipe. A specific saddle and ring gear is used for each diameter of pipe and the carriage is removably mounted to the ring gear. Thus, set-up requires only that the user mount the saddle on the pipe and attach the carriage to the ring gear. Since the carriage travels on the ring gear and not on the pipe surface, extremely accurate cutting is possible at a relatively high speed. However, if the pipe is not round, as the carriage travels on the round ring gear, the distance between the torch and the outer surface of the pipe will vary along the out-of-round pipe. As a result, a torch angled to produce a beveled cut will cause the cut to deviate from the anticipated plane of the cut transverse to the pipe. To overcome this deviation, some known ring gear devices raise and lower the torch radially in relation to the pipe. However, raising and lowering the torch in a radial direction still introduces inaccuracy into the cut if the pipe contour which causes the torch to be raised and lowered is not the same as the pipe contour in the path of the torch. Presently known ring gear devices with out-of-round capability therefore provide limited assistance in maintaining cut accuracy.

A further problem with known ring gear devices with a mechanism for raising and lowering the torch in response to out-of-round contours is that the mechanism is an integral part of the device. A purchaser who may or may not have a need for out-of-round capability in the future must choose whether to buy the considerably more expensive out-of-round equipment which may never be needed or the device that does not have the out-of-round capability. If it is subsequently necessary to buy the more expensive out-of-round device the other device may be useless.

Another problem with known ring gear devices with out-of-round capability is that the structure affording the out-of-round capability complicates the device to the extent that time consuming adjustments are necessary to configure the assembly so as to permit making inverted bevel cuts.

It is, therefore, an object of this invention to provide a ring gear mounted rack adjustable torch arm carriage which bevel cuts round pipe accurately. Another object of this invention is to provide a ring gear mounted rack adjustable torch arm carriage which is adaptable to receive a separate assembly affording out-of-round capability. A further object of this invention is to provide a ring gear mounted rack adjustable torch arm carriage which affords out-of-round capability without radially displacing the torch arm. Yet another object of this invention is to provide a ring gear mounted rack adjustable torch arm carriage which affords out-of-round capability by angular motion of the torch about an axis parallel to the pipe axis. It is also an object of this invention to provide a ring gear mounted rack adjustable torch arm carriage which is rack adjustable to vary the distance between the guide assembly and the torch. Still another object of this invention is to provide a ring gear mounted rack adjustable torch arm carriage which is readily adjustable to permit inverted bevel cuts.

SUMMARY OF THE INVENTION

In accordance with the invention, a torch carriage assembly is provided for use in bevel cutting a pipe. A ring gear having a diameter greater than the diameter of the pipe is adapted to be mounted on the pipe for concentric rotation about the longitudinal axis of the pipe. A shaft is mounted on the ring gear and extends perpendicularly therefrom. A torch arm block assembly is fixed on the shaft and adapted to position the cutting torch in relation to the pipe so as to travel a desired cutting path on the pipe as the ring gear is rotated about the pipe longitudinal axis. A shaft mounting bracket is adaptable between a first configuration prohibiting rotation of the shaft about its longitudinal axis and a second configuration permitting rotation of the shaft about its longitudinal axis. In the first configuration the device is usable for bevel cutting round pipes and in the second configuration for bevel cutting out-of-round pipes. When in the second configuration for bevel cutting out-of-round pipes, a guide wheel assembly is also used. The guide wheel assembly is adapted to be mounted on the shaft and has a guide wheel which traces the surface of the pipe as the shaft moves concentrically about the longitudinal axis of the pipe. The guide wheel assembly causes rotation of the shaft and therefor rotation of the torch arm block assembly in response to out-of-round conditions on the surface of the pipe. A tension assembly linking the shaft and the ring gear is adapted to continually urge the guide wheel into contact with the surface of the pipe so that the angular position of the torch arm block assembly accurately reflects out-of-round conditions on the surface of the pipe.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
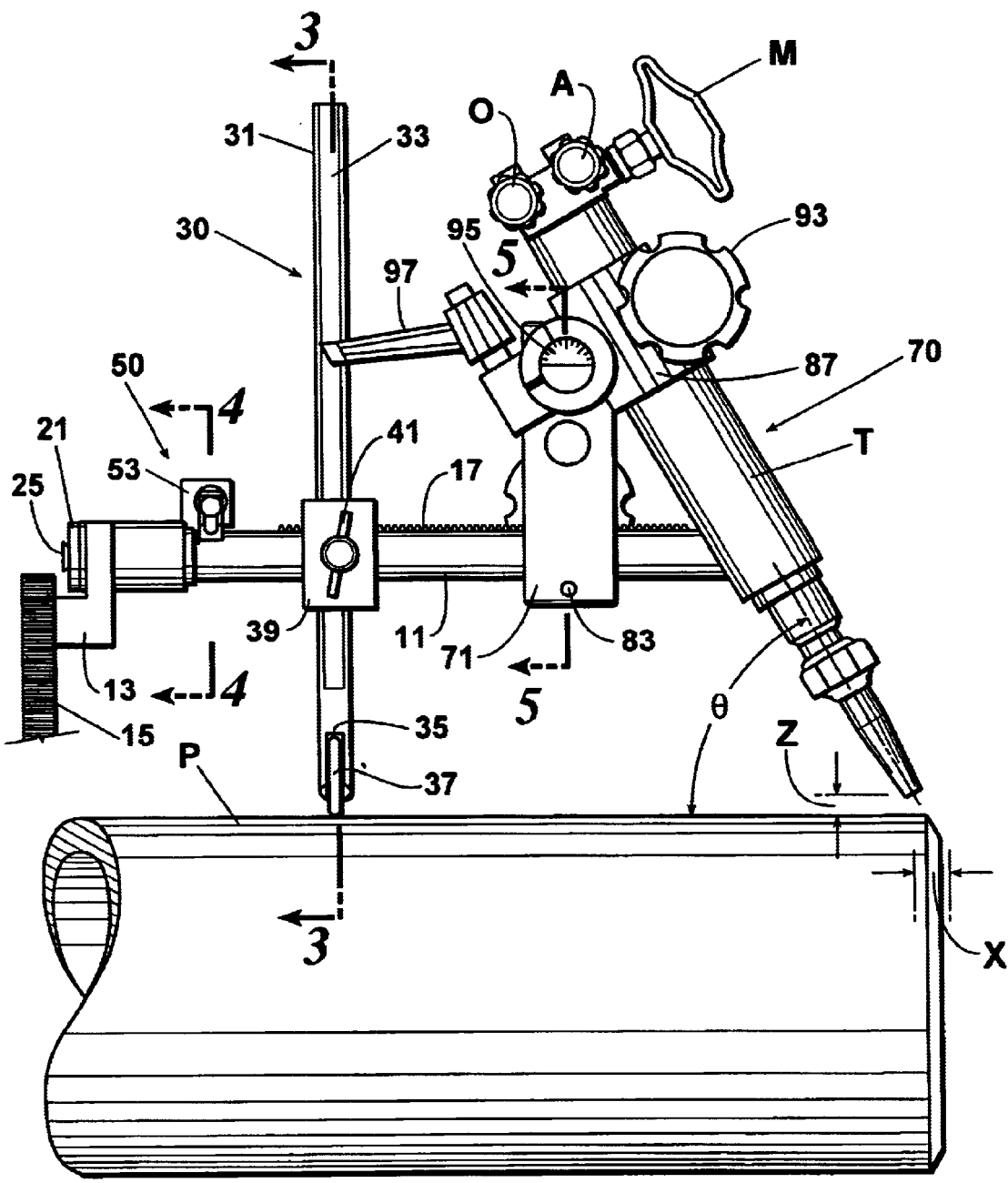
FIG. 1 is a front elevation view of a preferred embodiment of the ring gear mounted rack adjustable torch arm carriage assembly with out-of-round capability.
Figure 2:
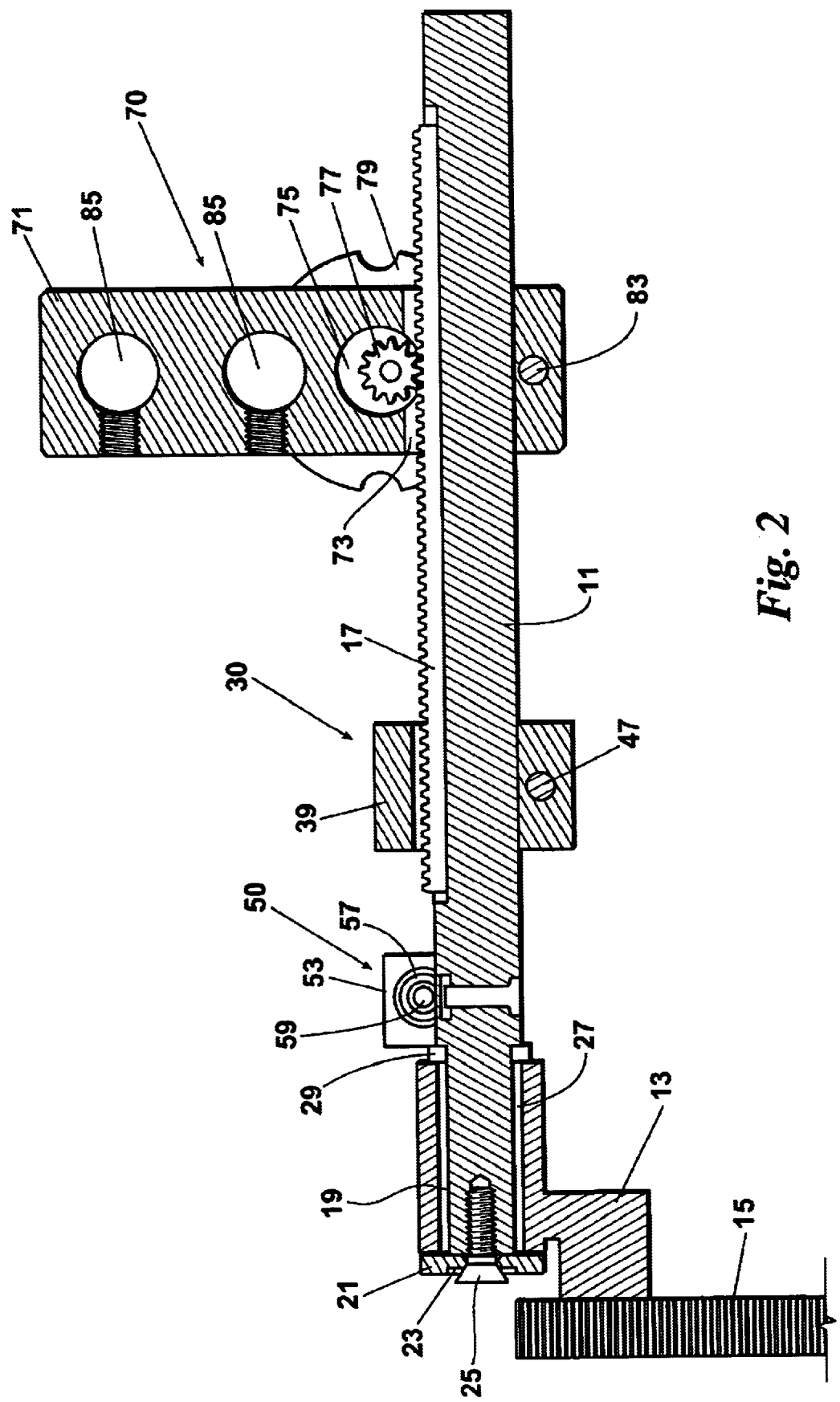
FIG. 2 is a cross-sectional view taken in vertical plane through the shaft of the carriage assembly of FIG. 1.

Turning first to FIGS. 1 and 2, a ring gear mounted carriage assembly for bevel cutting a pipe P using a torch T is illustrated. A shaft 11 extends in longitudinal alignment with the pipe P from a bracket 13 which is fixed to the ring gear 15 of a saddle machine (not shown) seated on the pipe P. As the ring gear 15 is rotated about the pipe P, the bracket 13 carries the shaft 11 with the longitudinal axis of the shaft 11 traveling in a circular path defining a cylinder around the longitudinal axis of the pipe P. Given a fixed and accurate circular configuration of a ring gear concentrically disposed about the longitudinal axis of the shaft 11, if the pipe P is out-of-round along the path of the cut to be made by the torch T, the distance between the end of the torch T and the surface of the pipe P will vary accordingly. As shown in FIG. 1, for a bevel cut at an angle θ, if an out-of-round pipe condition causes variance in the vertical spacing Z between the end of the torch T and the surface of the pipe P, then the path of the cut will deviate inwardly and outwardly in the X direction on the pipe P as the distance Z increases and decreases, respectively.

As shown in FIGS. 1 and 2, the shaft 11 supports a guide wheel assembly 30, a spring tension assembly 50 and a torch arm block assembly 70. The torch arm block assembly 70 travels on a rack 17 so that the entire torch arm block assembly 70 can be reciprocated in the X direction on the shaft 11. As best seen in FIG. 2, the shaft 11 is seated in a bore 19 in the bracket 13. A washer 21 at the end of the shaft 11 and bracket 19 has a seat 23 with a diameter slightly greater than the diameter of the shaft 11. If the washer 21 is reversed so that the washer face having the seat 23 is against the end of the shaft 11 then, when the screw 25 is inserted through the washer 21 and tightened into the shaft 11, the shaft 11 will insert into the seat 23 so that the face of the washer 21 can abut the bracket 13. In this condition, the washer 23 binds the shaft 11 in relation to the bracket 13 and the shaft 11 is unable to rotate about its longitudinal axis. In this condition, the torch arm block assembly 70 can be used without the guide wheel assembly 30 to bevel cut pipes P which are not out-of-round. However, by reversing the washer 23 to the condition shown in FIG. 2, the end of the shaft 11 is not engaged in the seat 23. Therefore, when the screw 25 is tightened through the washer 23, the washer 23 is pulled into abutment with the shaft 11 but is not pulled into abutment with the bracket 13. Therefore, without other provision, the shaft 11 is free to rotate on the bracket 13 on bearings 27 about its longitudinal axis. Another washer 29 on the opposite end of the bracket 13 from the seated washer 23 and abutting a land on the shaft 11 completes this reversible assembly.

Figure 3:
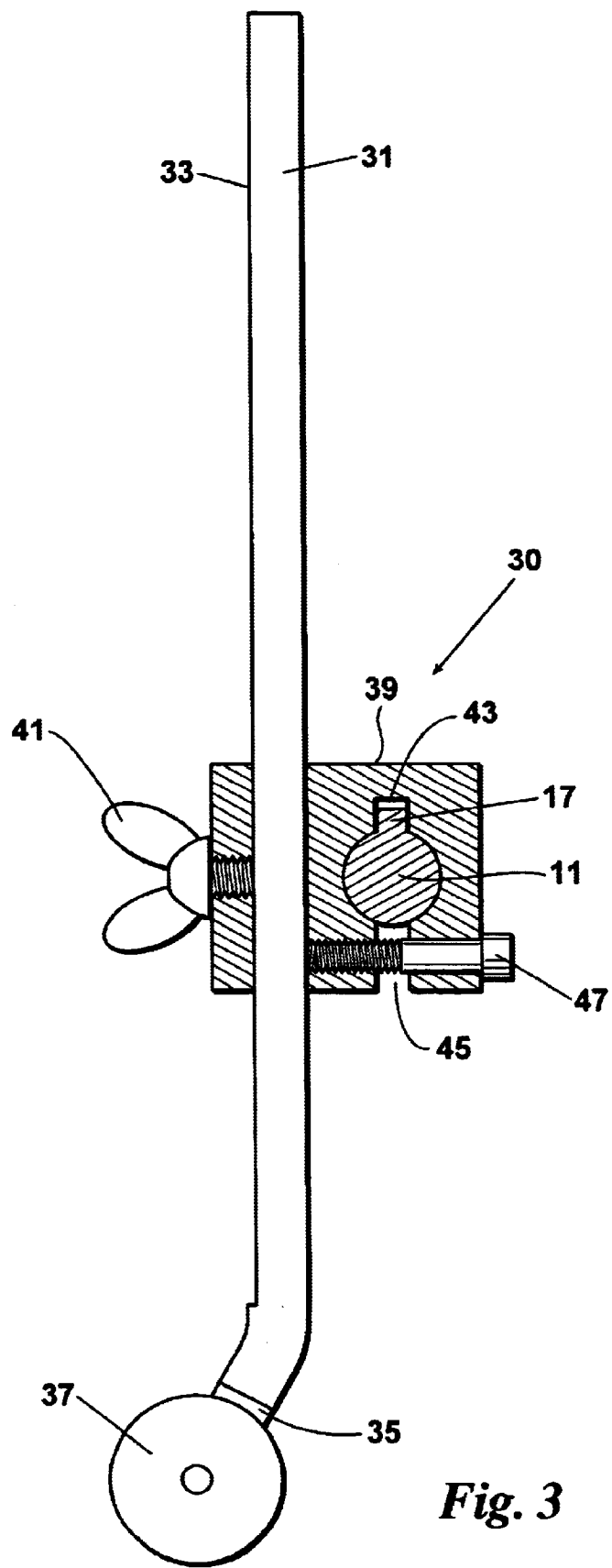
FIG. 3 is a cross-sectional view taken along the line 3—3 of FIG. 1.

If out-of-round capability is desired, the user can later purchase the guide wheel assembly 30, reverse the washer 21 to allow rotation of the shaft 11, and convert the existing device into an out-of-round device. With the washer 21 in the position shown in FIG. 2, the shaft 11 is free to rotate to accommodate use of the torch arm block assembly 70 in bevel cutting and out-of-round pipe P. Looking at FIG. 3, a guide wheel assembly 30 for permitting rotation of the shaft 11 in response to out-of-round contours in the surface of the pipe P is illustrated. The guide wheel assembly 30 includes an arm 31 which is essentially a length of solid round stock having a chordal flat 33 along almost its entire length. The lower end of the arm 31 has a clevis 35 in which a guide wheel 37 is journaled for rotation. A mounting block 39 is slidably engaged for vertical reciprocation on the rod 33. The bore through which the arm 31 extends has a corresponding flat engaged with the flat 33 on the arm 31. This locks the block 39 against rotation about the longitudinal axis of the arm 31. A wing nut 41 extends into the block 39 to engage with the flat 33 of the arm 31. Thus, the wing nut 41 serves as a set screw for fixing the elevation of the block 39 in relation to the arm 33. The block 39 also has a bore extending on an axis transverse to the arm 33 through which the shaft 11 extends. The top of the bore is machined 43 to permit the rack 17 on the shaft 11 to pass through the block 39. The bottom of the block 39 is also machined 45 so that a lock screw 47 extending into the block 39, through the machined portion 45 and into the block 39 can be used to clamp the block 39 to the shaft 11. As shown, the lower end of the arm 31 is forwardly angled so as to permit the torch T, when the structure is complete, to be radially aligned with the longitudinal axis of the pipe P.

As best seen in FIG. 1, once the guide wheel assembly 30 is positioned on the shaft 11, the permanent location of the guide wheel assembly 30 can be set by loosening the lock screw 47, adjusting the position of the guide wheel assembly 30 in the X direction and tightening the lock screw 47 to fasten the block 39 to the shaft 11. The wing nut 41 can then be loosened and the position of the arm 31 in the block 39 vertically adjusted so that the guide wheel 37 is in appropriate disposition on the surface of the pipe P. The wing nut 41 can then be tightened to secure the arm 31 in this position.

Figure 4:
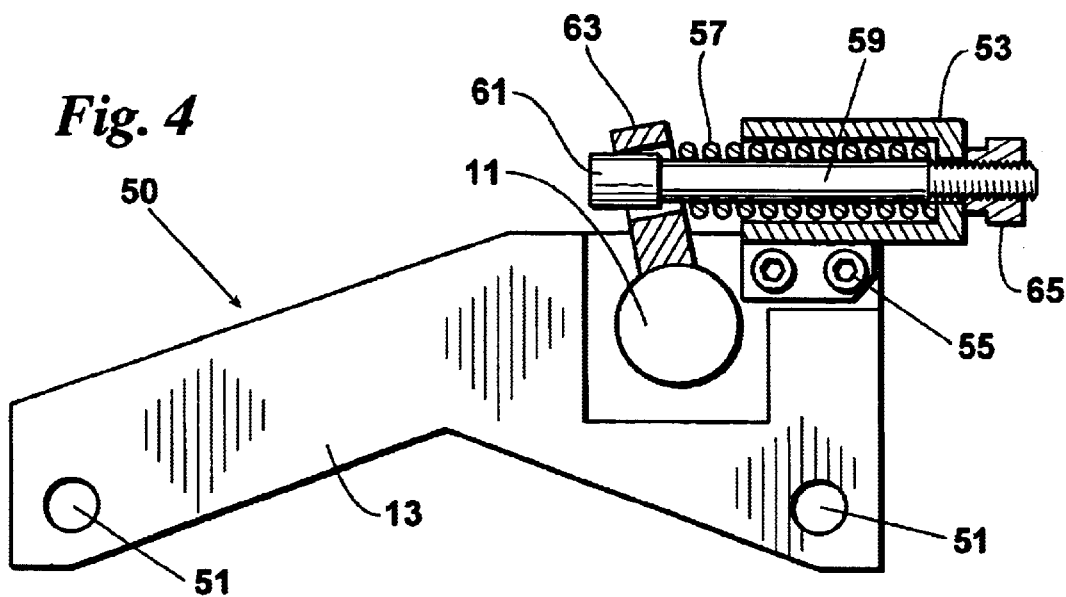
FIG. 4 is a cross-sectional view taken along the line 4—4 of FIG. 1.

Turning to FIG. 4, the spring tension assembly 50 is illustrated in greater detail. As best seen in FIG. 2, the bracket 13 is fixed to the ring gear 15, preferably by the use of bolts or screws through holes 51 provided through the bracket 13. The shaft 11 extends through the bracket 13 and, when engaged with the unseated side of the washer 21, is free to rotate within the bracket 13. A spring housing 53 is fastened to the bracket 13, as shown by use of bolts 55. A spring 57 coiled about a spring shaft 59 extends from a closed end of the housing 53 through an open end of the housing 53. The shaft 59 extends to a travel limit 61. A spring block 63 fixed to the shaft 11 and extending radially from the shaft 11 has a bore through its radial end through which the spring shaft 59 extends to the travel limit 61. A tension adjustment knob 65 threaded on the spring shaft 59 at the closed end of the housing 53 permits the tension of spring which biases against rotation of the shaft 11 to be adjusted so as to constantly urge the wheel 37 of the guide wheel assembly 30 against the surface of the pipe P throughout the motion of the guide wheel 37 about the circumference of the pipe P. As the guide wheel 37 traces out-of-round conditions, the guide wheel 37 causes the shaft 11 to rotate accordingly.

Figure 5:
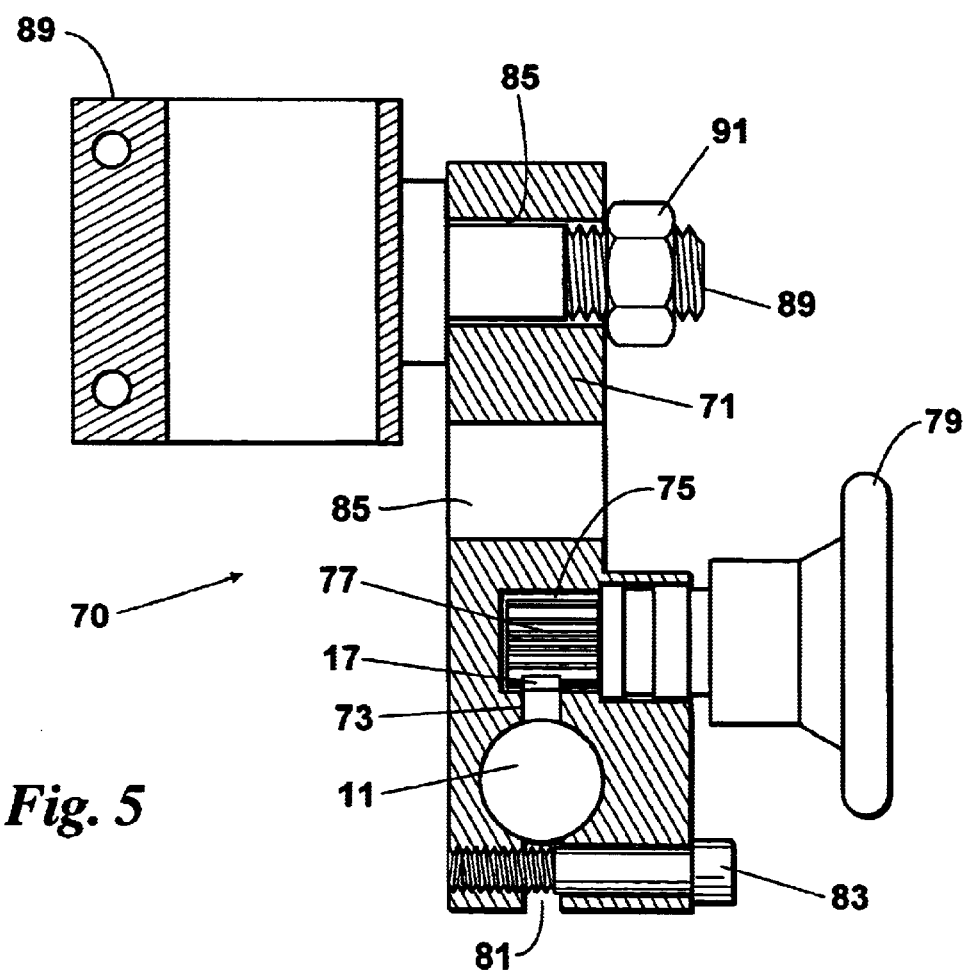
FIG. 5 is a cross-sectional view taken along the line 5—5 of FIG. 1.

Turning now to FIG. 5, the torch arm block assembly 70 is illustrated in greater detail. The assembly 70 includes a torch arm block 71 having a bore in a lower portion thereof so that the block 71 can be disposed on the shaft 11. As shown, the block is machined 73 so as to accommodate passage of the rack 17 through the block. The block 71 is also machined 75 to accommodate a pinion 77 rotatable by an adjustment knob 79 and cooperable with the rack 17 to manually reciprocate the block 71 in the X direction on the shaft 11. The block is also machined 81 so that a lock screw 83 extending through the block 71 across the machined portion 81 and again into the block 71 permits securing the block 71 against movement in the X direction after the block 71 has been positioned by rotation of the knob 79. The upper part of the block 71 is provided with a pair of parallel bores 85, one below the other, in which a torch holder 87 can be disposed. A torch holder support 89 is extended through one of the bores, as shown the upper bore 85, and is locked in place by a nut 91. In order to maintain proper orientation of the holder 87, the support 89 is provided with pins (not shown) which engage in apertures (not shown) in the block 71 and are locked in this position by the tightening of the nut 91 on the support 89.

Figure 6:
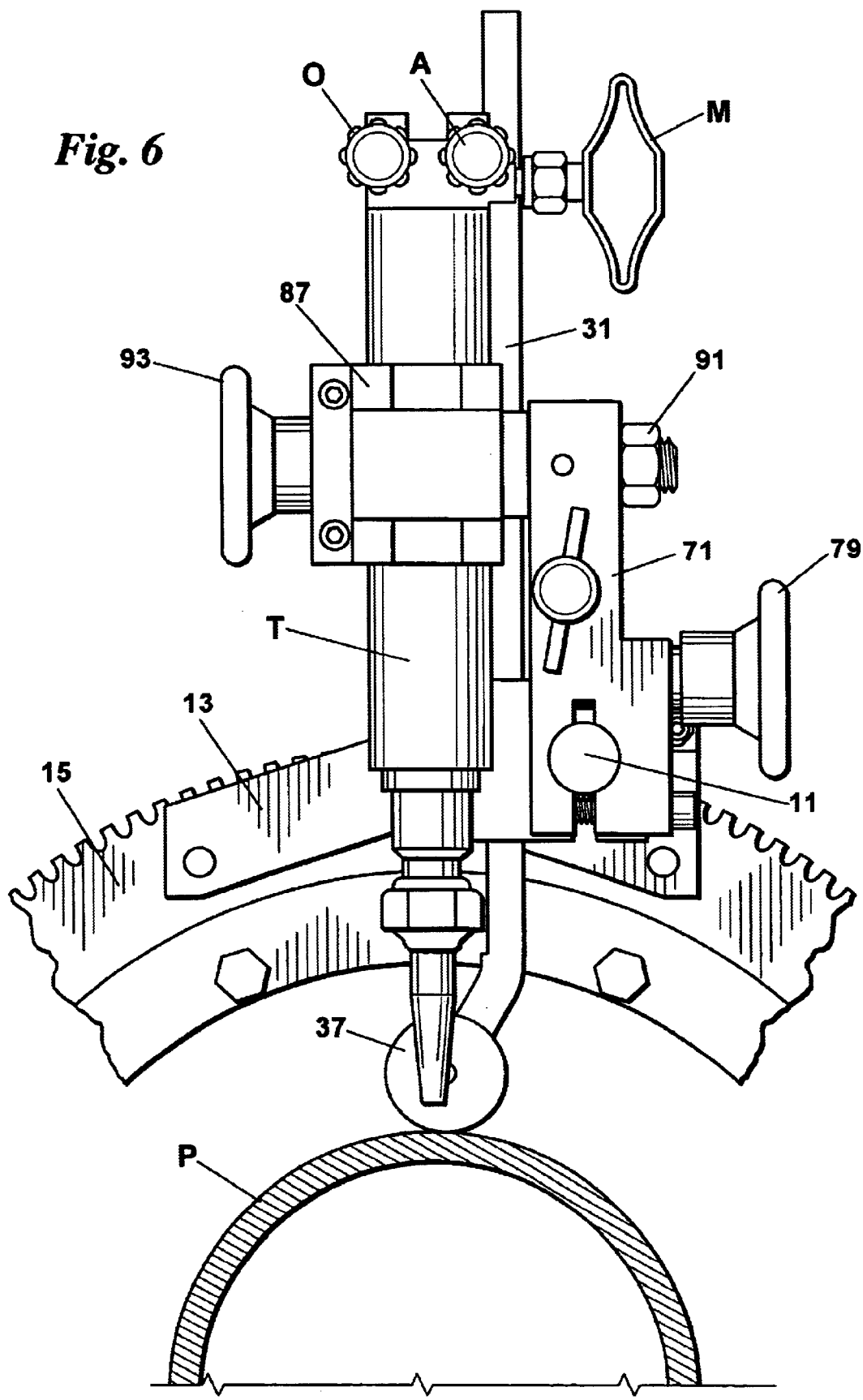
FIG. 6 is an elevation view with parts broken away of the carriage assembly of FIG. 1 used in conjunction with an out-of-round pipe.

Turning to FIG. 6, the torch T is aligned in substantially a diametric plane in relation to the longitudinal axis of the pipe P with the guide wheel 37 riding on the surface of the pipe P. In response to variations in the contour of the pipe P, rather than restricting motion solely in a radial direction in relation to the horizontal axis of the pipe P, the guide wheel assembly 30 causes the torch arm block assembly 70 to rotate about the shaft 11. Since the response of the guide wheel assembly 30 to irregularities in the contour of the outer surface of the pipe P is to rotate rather than raise or lower the position of the torch T relative to the surface of the pipe P, variations in Z direction displacement are minimized and therefore cutting inaccuracies in the X direction are also minimized. Moreover, looking at FIG. 1, since the torch T is at the angle θ, to produce a bevel cut, the impact of any radial displacement from the surface of the pipe P is offset to some degree by the concomitant variation in the angle θ which is no longer in a vertical plane. The net result is a more accurate cut than is possible in bevel cutting devices using only radial displacement of the torch T from the pipe P.

Figure 7:
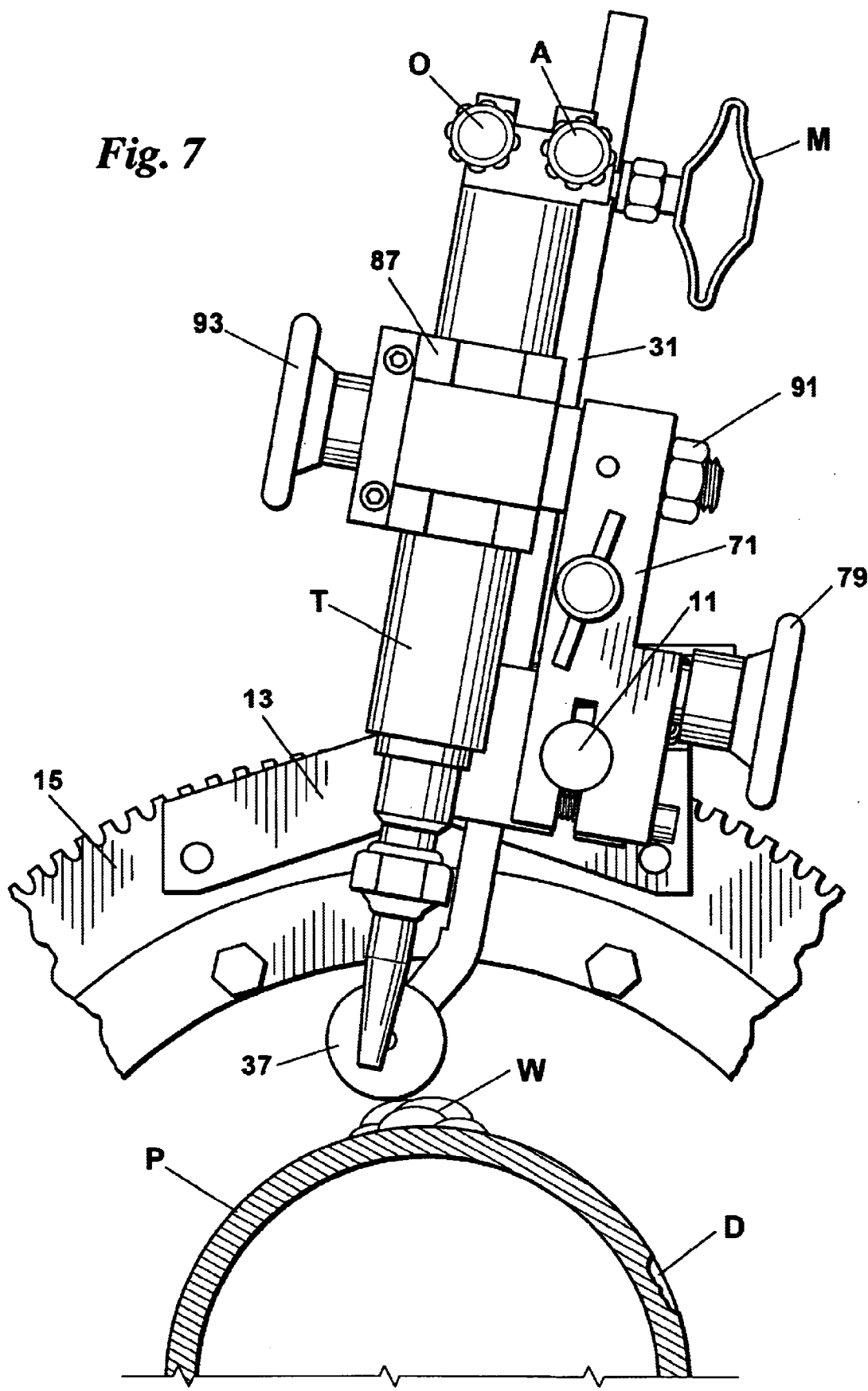
FIG. 7 is an elevation view with parts broken away of the carriage assembly of FIG. 1 used in conjunction with an out-of-round pipe having high and low spots on its outer surface.

Looking at FIG. 7, the operation of the guide wheel assembly 30 and resultant positioning of the torch T is illustrated in relation to an exacerbated deformity in the contour of the pipe P, as shown perhaps by a weld W on the outer surface of the pipe P or a depression D in the pipe P on or into which the guide wheel 37 will be raised or depressed in response to the tension in the spring tension assembly 50.

Looking again at FIGS. 1, 6 and 7, the torch holder 87 may also include a rack and pinion assembly controlled by an adjustment knob 93 to permit the manual variation of the distance between the tip of the torch T and the pipe P. Furthermore, the torch holder 87 may be secured to the torch arm block 71 using a torch arm support 95 which permits angular displacement of the support 89 by operation of a bevel angle ratchet handle 97. That is, with the ratchet handle 97 in a release position, the torch support 89 can be rotated on the torch arm support 95 to provide the desired angular position of the torch T and the ratchet handle 97 rotated to a locked position to assure that this angle is maintained throughout operation of the device. Typically, the torch T is provided with oxygen and acetylene control valves O and A, respectively, and a main torch valve M for admitting the proper mix of oxygen and acetylene to the torch T.

It should be noted that, with the torch arm block assembly 70 being manually reciprocable on the rack 17, inverted bevel cuts are easily accomplished by transferring the torch arm block 71 to a suitable position on the shaft 11 and using the bevel angle ratchet handle 97 to permit rotation of the torch T from a normal bevel position which is forward of vertical alignment of the torch T to an inverted bevel position which is rearward of vertical alignment of the torch T.

Thus, it is apparent that there has been provided, in accordance with the invention, a ring gear mounted rack adjustable torch arm carriage assembly with out-of-round capability that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A torch carriage assembly for use in bevel cutting a pipe comprising a ring gear having a diameter greater than a diameter of the pipe and adapted to be mounted on said pipe for concentric rotation about the longitudinal axis of the pipe, a shaft mounted on said ring gear and extending perpendicularly therefrom, a torch arm block assembly mounted on said shaft and adapted to position the cutting torch in relation to the pipe so as to travel a desired cutting path oh the pipe as said ring gear is rotated about the pipe longitudinal axis and means adaptable between a first configuration for prohibiting rotation of said shaft about a longitudinal axis thereof and a second configuration for permitting rotation of said shaft about said longitudinal axis thereof.

2. A torch carriage assembly for use in bevel cutting a pipe comprising a ring sear having a diameter greater than a diameter of the pipe and adapted to be mounted on said pipe for concentric rotation about the longitudinal axis of the pipe, a shaft mounted on said ring gear and extending perpendicularly therefrom, a torch arm block assembly mounted on said shaft and adapted to position the cutting torch in relation to the pipe so as to travel a desired cutting path on the pipe as said ring gear is rotated about the pipe longitudinal axis, means adaptable between a first configuration for prohibiting rotation of said shaft about a longitudinal axis thereof and a second configuration for permitting rotation of said shaft about said longitudinal axis thereof and a guide wheel assembly mounted on said shaft and having a guide wheel adapted to trace a surface of the pipe as said shaft moves concentrically about the longitudinal axis of the pipe, said guide wheel assembly causing rotation of said shaft in response to out-of-round conditions on the surface of the pipe.

3. An assembly according to claim 2 further comprising a tension assembly linking said shaft and said ring gear and adapted to continually urge said guide wheel into contact with the surface of the pipe.

4. A torch carriage assembly for use in bevel cutting a pipe comprising a ring gear having a diameter greater than a diameter of the pipe and adapted to be mounted on said pipe for concentric rotation about the longitudinal axis of the pipe, a shaft mounted on said ring gear and extending perpendicularly therefrom, a torch arm block assembly mounted on said shaft and adapted to position the cutting torch in relation to the pipe so as to travel a desired cutting path on the pipe as said ring gear is rotated about the pipe longitudinal axis, means permitting rotation of said shaft about said longitudinal axis thereof and a guide wheel assembly mounted on said shaft and having a guide wheel adapted to trace a surface of the pipe as said shaft moves concentrically about the longitudinal axis of the pipe, said guide wheel assembly causing rotation of said shaft in response to out-of-round conditions on the surface of the pipe.

* * * * *